No. 758,693. PATENTED MAY 3, 1904.
O. B. REYNOLDS.
DUMPING WAGON.
APPLICATION FILED NOV. 2, 1903.
NO MODEL. 3 SHEETS—SHEET 1.
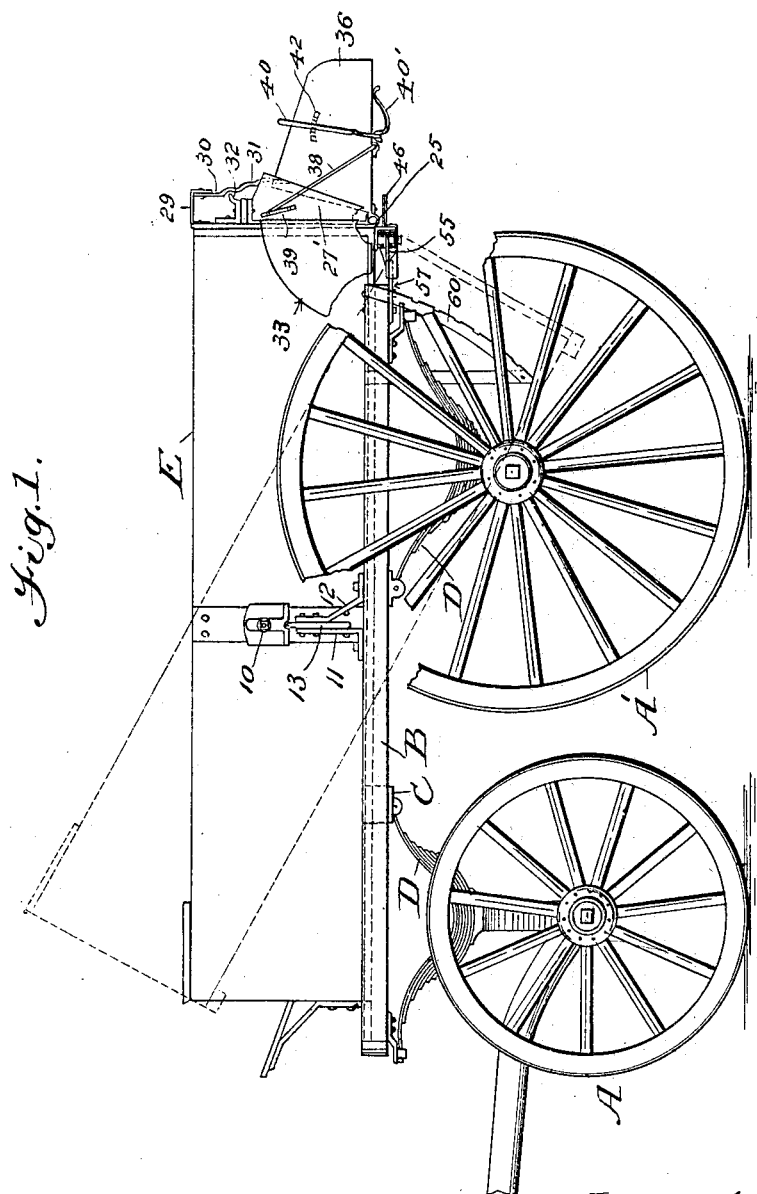
Witnesses:
Inventor
Oliver B. Reynolds
by J. Walter Fowler
his Attorney

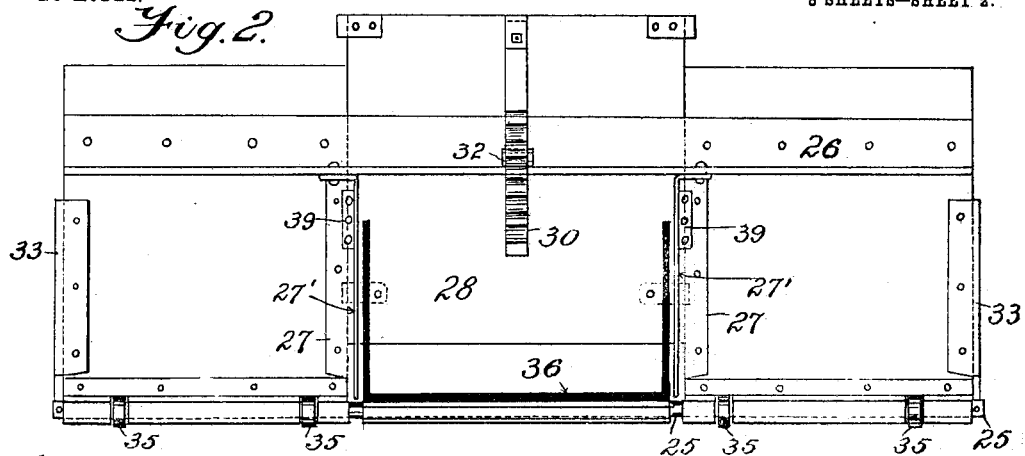
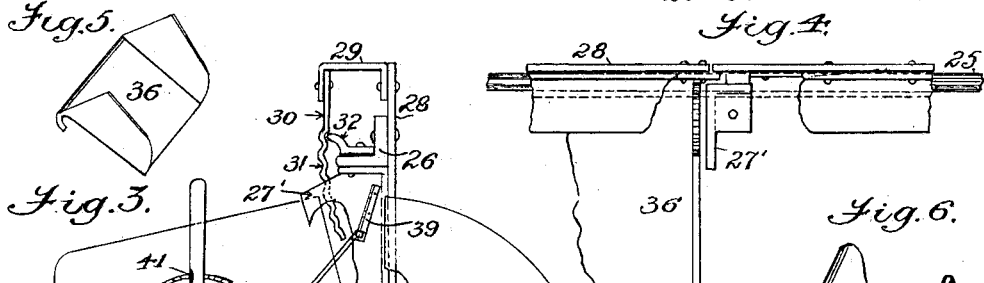
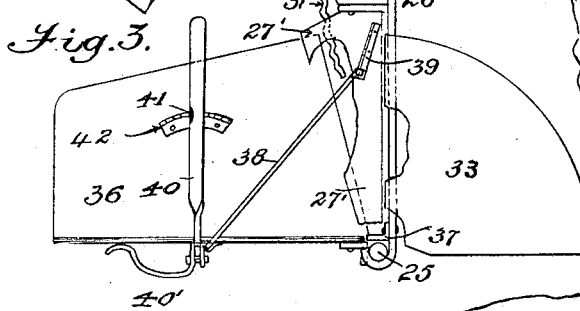
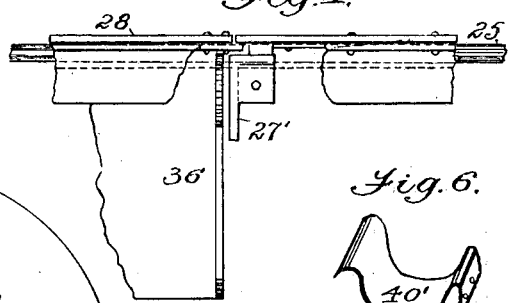
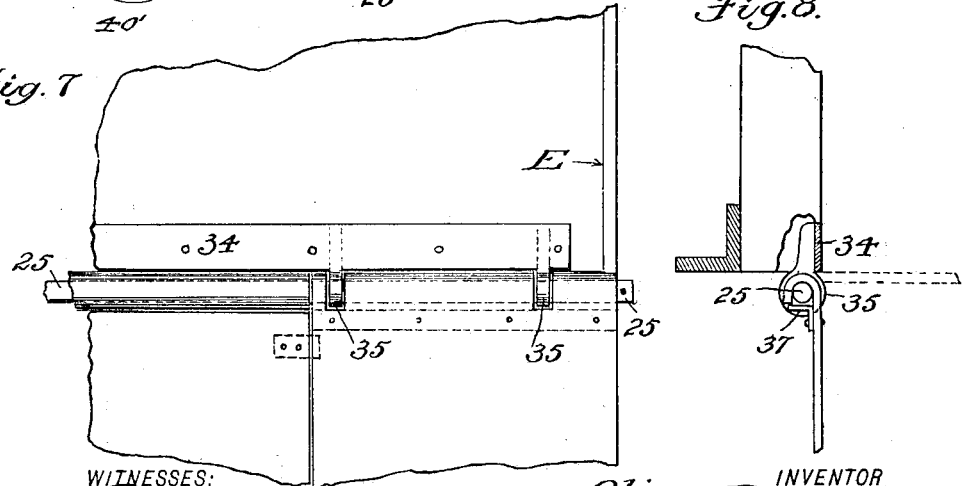

No. 758,693. PATENTED MAY 3, 1904.
O. B. REYNOLDS.
DUMPING WAGON.
APPLICATION FILED NOV. 2, 1903.
NO MODEL. 3 SHEETS—SHEET 3.
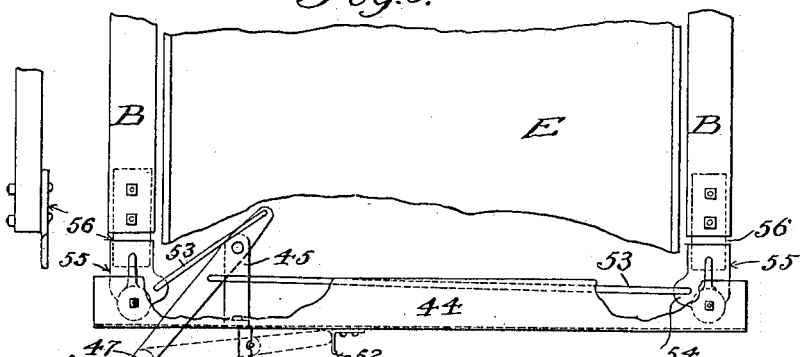
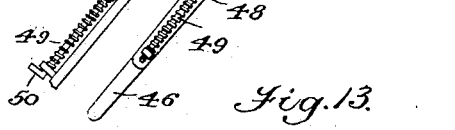
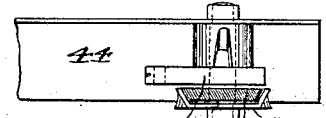
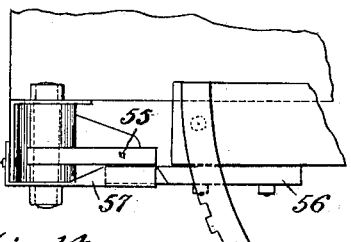
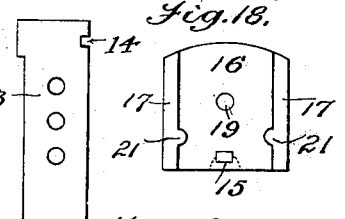
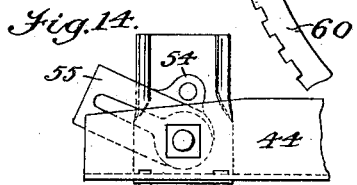
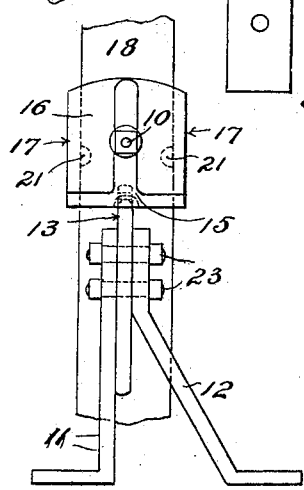
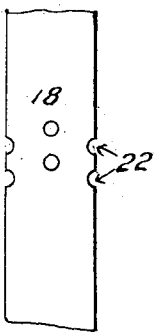
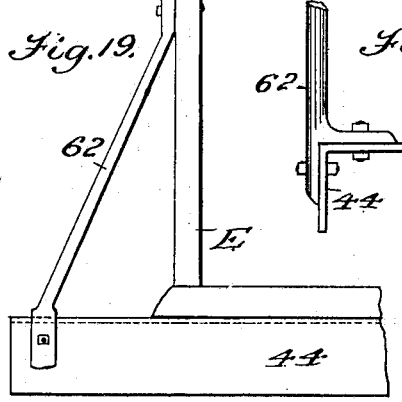
WITNESSES:
C. W. Fowler
P. H. Birckhead
INVENTOR
Oliver B. Reynolds
BY
T. Walter Fowler
his ATTORNEY No. 758,693.　　　　　　　　　　　　　　　　　　　　　　Patented May 3, 1904.

UNITED STATES PATENT OFFICE.

OLIVER B. REYNOLDS, OF BROCKTON, MASSACHUSETTS.

DUMPING-WAGON.

SPECIFICATION forming part of Letters Patent No. 758,693, dated May 3, 1904.

Application filed November 2, 1903. Serial No. 179,427. (No model.)

*To all whom it may concern:*

Be it known that I, OLIVER B. REYNOLDS, a citizen of the United States, residing at Brockton, in the county of Plymouth and State of Massachusetts, have invented new and useful Improvements in Dumping-Wagons, of which the following is a specification.

My invention relates to certain new and useful improvements in that class of vehicles designed for hauling heavy loads and commonly known as "dumping-wagons;" and my invention consist of the parts and the constructions and combinations of parts, which I will hereinafter describe and claim.

In the accompanying drawings, forming part of this specification, and in which similar characters of reference indicate like parts throughout the several views, Figure 1 is a side elevation, partly broken away, of a dumping wagon embodying my invention. Fig. 2 is an end view of the wagon-body. Fig. 3 is a side view of the end-gate and chute. Fig. 4 is a plan view of a portion of Fig. 3. Fig. 5 is a perspective view of the chute. Fig. 6 is a perspective view of the elevating-arm for the chute. Fig. 7 is a plan view of a portion of the wagon-body and hinge connections. Fig. 8 is a side elevation of Fig. 7, partially broken away. Fig. 9 is a bottom plan view, partially broken away, showing the means for locking the body. Figs. 10 to 18 illustrate details of body-locking devices. Figs. 19 and 20 are details to be referred to.

In constructing my improved wagon I use any appropriate and well-known form of running-gear, comprising front and rear wheels A A' and a frame consisting of longitudinal side bars B and one or more cross-bars C, said frame being supported upon springs D, as shown in Fig. 1. While I have described and shown the wagon as containing the aforesaid features, it will be manifest that other designs of wagon may be used and the salient features of my invention applied thereto. I therefore do not limit my present improvements to any particular type of dumping-wagon.

The wagon-body E is tiltable about a pivotal connection at 10, and it is designed to discharge its load through an end-gate or a chute which forms a part thereof, as I shall hereinafter describe.

To the longitudinal side bars B of the wagon I bolt or otherwise rigidly secure, one on each side and centrally located with respect to the wagon-body, a standard which consists of an angle-iron 11, a brace member 12, and a vertical plate or bar 13, bolted between the upper ends of the angle-iron 12 and the brace and having its upper end extending above the top of said angle-iron and brace and having a notch 14 formed in one edge near the upper end adapted to interlock with a lug 15 on the inner face of a channeled plate 16, having side flanges 17 to embrace the edges of a plate 18, bolted to the outer sides of the wagon-body and extending from top to bottom thereof, as shown in Fig. 1. The detailed construction of the parts just described appear in Figs. 15 to 18, inclusive, where it will be seen that the said channeled plate 16 is provided with an opening or bearing 19 for the trunnion 10, projecting from the plate 18, said channeled plate having also on the inner walls of its side flanges suitable lugs or projections 21, adapted to interlock with corresponding notches or recesses 22 in the edges of the plate 18. These recesses or notches are in vertical series to permit the channeled plate 17 to be vertically adjusted. The plate 13 is also provided with a vertical series of holes for the bolts 23, which secure it in place between the brace and angle-iron 11 of the standard, thereby permitting the said plate 13 to be vertically adjusted to correspond to the adjustment of the channeled plate. As the plates 17 receive the trunnions, which project from the sides of the wagon-body or the plates 18 thereof, it will be manifest that the trunnions, which are the pivotal center about which the wagon-body tilts in dumping, will be raised and lowered and the point of suspension of the body so located relative to the load carried that the trunnions may be maintained substantially in the center of gravity of the load, as more fully shown, described, and claimed in my former patent, No. 604,789, dated May 31, 1898. From this description it will be understood that if the wagon-body is thus centrally suspended and is fully loaded the weight of the load is evenly distributed and nicely balanced and the body can be readily tilted; but if the body is loaded with about, say, one-half of its capacity it would be more capable of easy tilting if its point of suspension were correspondingly lowered on the body, so as to be located approximately in the center of the load. This change of the suspension-point of the body is readily accomplished by lowering the plate 13 and correspondingly lowering the channeled plate relative to the plate 18, the lugs 21 interlocking with the notches or recesses 22 in said plate 18 and the bolts 23 engaging the holes in the plate 13, as before described, said bolts being then secured by appropriate nuts, as shown in Fig. 15.

The wagon-body is also provided with an end-gate for the discharge of material and has a chute which may be let down and adjusted to various inclinations. This end-gate and chute appears in detail particularly in Figs. 2 and 3, and it swings about the transverse shaft 25 in opening and closing. Across the upper portion of the end-gate is fixed an angle-iron 26, and on the back of the gate, between this angle-iron and the bottom of said gate, are vertical plates 27, which form guides for a vertically-movable slide-gate 28, controlling an opening located approximately in the center of the end-gate and adapted to communicate with an appropriate chute, as I will hereinafter describe, the said vertical guide-plates 27 having outwardly-extending flanges 27', which taper from their upper ends downwardly and are adapted to cover the joint between the inner end of the chute and the end-gate and prevent the escape of coal or material through the space which is formed when the chute is let down into an operative position. The slide-gate 28 is provided at its top with a bent iron or angle piece 29, which serves as a handle, and thereby facilitates the opening and closing sliding movements of said gate, and extending from this handle portion down over the outside of the gate is a spring-plate 30, having corrugations or serrations 31 adapted to be engaged by an upwardly-curved lug or finger 32, extending from a plate bolted or otherwise fixed to the angle-iron 26, whereby the slide-gate may be held in any of its adjusted open positions.

At the ends of the swinging end-gate are secured the wings 33, which extend over the rear outer sides of the wagon-body and cover the joint between the end-gate and end of said body and prevent the escape of material over the ends of the gate when said gate is lowered.

Across the end of the bottom of the wagon-body is bolted or otherwise secured a plate 34, made rigid with outwardly-extending lugs 35, which are pierced to form eyes for the reception of the transverse rod or shaft 25, which extends across the bottom of the end-gate close to the plate 34 and substantially in the plane of the inside of the bottom and forms the axis about which the end-gate opens and closes. The plate 34, with its lugs or eyes, forms one member of the end-gate hinge, another member of said hinge being formed by the gate itself, having its lower edge bent or fashioned into an outwardly-curved form to embrace the shaft 25 and being retained on said shaft by an angle-iron 37, which guards the open end of the loop formed by the bending of the lower edge of the gate into a curved form, as shown in Figs. 3, 7, and 8. The curved end of the gate is also recessed to receive the eyes or lugs of the plate 34, thus allowing the end of the gate to be brought up close to the outer edge of the plate 34, which edge is flush with the rear extremity of the wagon bottom or floor, and thereby form a close joint between the bottom of the gate and the bottom of the body to prevent the escape of fine material. This arrangement also provides for the end-gate being in line with the inside of the floor of the body, and no space is left between the rear end of said floor and the adjacent end of the end-gate for fine coal or material to pass through, neither of which features exists in those wagons where the end-gate is hinged to a wooden cross-bar in a plane below the inside floor-line of the body and has eyes which, as shown by experience, soon wear into said cross-bar, and thus open up comparatively large spaces through which fine coal will spill.

The chute 36 lies in the central portion of the end-gate, and its lower end is also curved to embrace the transverse rod or shaft 25, upon which latter the chute is turnable in vertical planes. The inner end of the chute is confined between and is guided in its movement by the tapering flanges 27', before mentioned, and said chute has its inclination varied at will by means of a bail 38 or like device, which crosses under the central portion of the chute and has each of its ends extending upwardly along the side of the chute and adapted to engage any one of several holes formed in the plates 39, secured to the tapering flanges 27', as shown in Fig. 3. In the case of an extra long chute I may partially support the weight of the same and raise and lower the chute more readily by employing a lever 40, Fig. 3, fulcrumed on the bottom of the chute and having a curved plate 40' reaching outward under the chute, said lever having a pawl at 41 adapted to engage the teeth of a segment 42, whereby the lever may be moved to the right or left to raise or lower the outer end of the chute and may then be held in the desired or adjusted position.

To lock the wagon-body to the side bars B, I may use various means; but the one I prefer and herein show in Figs. 9 to 14, inclusive, consists of an angle-iron bar 44, which extends transversely across the rear of the wagon-body and the rear ends of the side bars B said bar 44 provided with an arm 45, in which is pivotally mounted a lever 46, which extends out from the rear of the wagon, at one side thereof, and is jointed at 47, whereby the outer portion may be folded inward substantially parallel with the angle-iron cross-bar 44, as shown by dotted lines in Fig. 9. One member of the jointed lever 46 is provided with a notch 48, and the other member of said lever carries a spring-pressed slidable rod 49, one end of which is adapted to engage the notch of the other member of the lever to rigidly unite the two parts when the members of the levers are in line, as shown by the full-line position in Fig. 9, said spring-pressed rod having a bent end 50, adapted to catch behind a stud 51 on the rear of the angle-iron bar 44 to hold the rod retracted, when the joint of the lever is broken and the folding member is forced into the dotted position of Fig. 9. An angle-plate 52 guards the end of the folding member of the lever when said member is in the dotted position of Fig. 9 and locks or holds the balance of the lever firmly. Connected with the lever 46 at points equidistant from the pivot thereof are the oppositely-extending rods 53, whose outer ends are pivotally connected with lugs or ears 54 on the horizontal lock-blocks 55, said blocks being pivotally secured to the angle-iron cross-bar 44 and adapted when closed to extend beneath suitable plates 56, extending horizontally from and in line with the side bars B of the wagon-frame, whereby the wagon-body is prevented from tilting about its trunnions, said lock-blocks adapted when the lever 46 is operated to move them outwardly to swing clear of the plates 56, thereby removing the support of the latter and permitting the wagon-body to be readily tilted. Thus a movement of the lever 46 in one direction releases the lock-blocks from under the plates or bars 56 and allows the body to be dumped, while a movement of the lever in an opposite direction closes the lock-blocks under said plates or bars 56 and locks the body against a dumping movement. To the angle-iron cross-bar 44 are bolted the channel-irons 57, one at each side, said irons extending horizontally inward and adapted to receive the bars or plates 56 and form a seat therefor, the edges of the bars or plates and the side walls of the channels in the irons 57 being beveled, as shown in Fig. 13, to effect a better seating of the parts. The lock-blocks 55 close over the channel-irons 57 and plates or bars 56, thus confining the bars 56 between the irons and blocks, as shown in Fig. 12, and when the blocks are moved outwardly the angle-iron cross-bar 44 and its attachments move downward away from the plates or bars 56 when the wagon-body is tilted, and when the body is righted the channel-irons receive the bars or plates 56, and the lever 46 is operated to cause the lock-blocks to close over the latter, as before described. Depending from the wagon-frame—say the side bars B—are the curved notched segments 60, one on each side, and when the lock-blocks are released to allow the body to tilt about its trunnions the desired angle or inclination of the body may be maintained by the lock-blocks being turned into engagement with one of the notches of the curved segments.

In Figs. 19 and 20 I disclose a brace 62, which connects the angle-iron cross-bar 44 with the wagon-body, whereby the two are rigidly connected.

From this description it will be seen that I am enabled to suspend the load centrally and tilt the body about a central axis. I am also permitted by an improved mechanism to change the axis of the body with relation to the weight carried, also provide an improved end-gate construction and improved means for locking the body in a level position.

While I have shown and described a complete dumping-wagon with an end-gate construction adapted thereto, I do not claim in this application the specific end-gate features, as the same forms the subject-matter of a divisional application filed by me December 26, 1903, Serial No. 186,561.

Having thus described my invention, what I claim as new, and desire to secure by Letters Patent, is—

1. In a dumping-wagon, a tilting body having trunnions about which it tilts, and means comprising vertical standards, plates mounted therein and vertically adjustable, and channeled plates supporting the trunnions and vertically adjustable whereby the trunnions may be maintained approximately in the center of gravity of the load.

2. In a dumping-wagon, a tilting body having trunnions about which it tilts in combination with trunnion-supporting means comprising vertical standards, vertical plates fitting the same and provided with a series of holes, bolts passing through the holes whereby the plates are vertically adjustable plates on the wagon-body and provided with notches, and channel-plates embracing the last-named plates and having lugs to adjustably engage the notches thereof said channel-plates supporting the trunnions about which the body tilts.

3. In a dumping-wagon, a tilting body having trunnions about which it tilts, means comprising vertical standards, plates mounted therein and vertically adjustable to maintain the trunnions in the center of gravity of the load, and a hinged end-gate.

4. In a dumping-wagon, a tilting body having trunnions about which it tilts, means comprising vertical standards, plates mounted therein and vertically adjustable to maintain the trunnions in the center of gravity of the load, an end-gate having a gate-controlled opening and a hinged chute communicating with said opening.

5. A dumping-wagon comprising a tilting body, trunnions upon which the same is supported, means for maintaining the trunnions in the center of gravity of the load, an end-gate, a slide-gate controlling an opening therein, a movable chute communicating with said opening, and means for locking the body against tilting movement.

6. In a dumping-wagon, a tilting body, and the stationary side bars, in combination with means for detachably locking the body to said bars comprising pivotally-mounted lock-blocks and means for moving them into and out of the plane of the side bars.

7. In a dumping-wagon, a tilting body and the stationary side bars, in combination with a bar across the rear of the body, a lever pivotally mounted upon the bar rods connecting with the levers upon opposite sides of its pivot, and extending in opposite directions, lock-blocks pivotally mounted on the cross-bar and connected to the rods whereby they may be caused to swing in lateral planes, and plates or bars projecting in line with the side bars and adapted to be engaged by said lock-bars to hold the body against tilting movement, said lock releasing said plates or bars and allowing the body to tilt, substantially as described.

8. In a dumping-wagon, the combination of a tilting body, the side bars, plates or bars secured to and extending in line with the side bars, a bar extending across the rear of the wagon-body and provided with channeled plates to receive said projecting plates or bars, lock-blocks pivotally mounted on the cross-bar and closable under the projecting plates or bars to lock the latter and prevent the body tilting, and means including a pivoted lever and oppositely-extending rods connecting with the lock-blocks, for operating the latter said lever jointed and provided with means for locking one member with the other whereby the members of the lever may stand in line or one member may be folded relative to the other member.

9. In a dumping-wagon, the combination with a tilting body, of the side bars having depending curved bars provided with notches, a bar fixed across the rear of the body, and blocks pivotally mounted on the cross-bar and adapted to be turned into engagement with the notches of the curved bars, to hold the body at different inclinations.

In testimony whereof I have hereunto set my hand in presence of two subscribing witnesses.

OLIVER B. REYNOLDS.

Witnesses:
FRANK SHERWOOD,
SALEM E. WELD.